United States Patent
Taguchi et al.

(10) Patent No.: US 7,085,144 B2
(45) Date of Patent: Aug. 1, 2006

(54) DEVICE FOR REMOVING INVERTER NOISE

(75) Inventors: Shin Taguchi, Anjo (JP); Kiyotaka Koga, Anjo (JP); Katsuhiko Hattori, Anjo (JP)

(73) Assignee: Aisin A W Co., Ltd, Anjo (JP)

( * ) Notice: Subject to any disclaimer, the term of this patent is extended or adjusted under 35 U.S.C. 154(b) by 0 days.

(21) Appl. No.: 10/870,022

(22) Filed: Jun. 18, 2004

(65) Prior Publication Data

US 2004/0257841 A1 Dec. 23, 2004

(30) Foreign Application Priority Data

Jun. 18, 2003 (JP) ............... 2003-173952

(51) Int. Cl.
*H02M 1/12* (2006.01)
*H02M 1/14* (2006.01)

(52) U.S. Cl. ............... 363/40; 363/44; 361/328
(58) Field of Classification Search ................ 363/39, 363/40, 44; 361/328
See application file for complete search history.

(56) References Cited

U.S. PATENT DOCUMENTS

| | | | | |
|---|---|---|---|---|
| 4,401,844 A | * | 8/1983 | Fleuret | 174/72 B |
| 5,875,091 A | * | 2/1999 | Rieken | 361/328 |
| 6,404,297 B1 | * | 6/2002 | Cherniski et al. | 333/12 |

FOREIGN PATENT DOCUMENTS

JP    2000-315929    11/2000

* cited by examiner

*Primary Examiner*—Bao Q. Vu
(74) *Attorney, Agent, or Firm*—Oliff & Berridge, PLC

(57) ABSTRACT

In a device for removing inverter noise, a pair of bus bars extending in parallel are grounded via a pair of capacitors. The capacitors are connected to the bus bars and to a grounding terminal at positions symmetrical to the pair of bus bars. Therefore, the inductance components are balanced from the source of noise to the grounded point, and impedance components are decreased from the two bus bars to a point grounded through the capacitors, making it possible to effectively remove high-frequency noise on the DC bus line of the inverter without requiring a large amount of space.

24 Claims, 5 Drawing Sheets

DEVICE FOR REMOVING INVERTER NOISE

This application claims priority from JP 2003-173952, filed Jun. 18, 2003, the disclosure of which in its entirety is incorporated herein by reference thereto.

BACKGROUND OF THE INVENTION

1. Field of Invention

The invention relates to a noise-removing device for removing high-frequency components flowing through a line by grounding a middle point of a DC bus line through a capacitor. More particularly, the invention relates to a noise-removing device adapted to an inverter for controlling electric motors in a drive unit for electric cars and in a drive unit for hybrid cars.

2. Description of Related Art

An inverter for driving electric motors is required by AC electric motors (in this specification, a motor and a generator that also works as a motor are both called electric motors) that are driven by a DC power source, such as a storage battery, as in a drive unit for electric cars and in a drive unit for hybrid cars. In a drive unit mounting, for example, two electric motors, as a motor and a generator, the inverter for use in the drive unit has a circuit structure as illustrated in FIG. 5 (omitting, however, the signal circuit). As shown, the inverter comprises a DC smoothing circuit F connected to a battery B which is a DC power source mounted on a vehicle, and a three-phase AC converter circuit E connected in parallel therewith and connected to the windings of U-, V-, W-phases of the motor M and the generator G. A separately arranged electric motor control unit is controlled based on the control signals output to a signal circuit of the inverter. That is, during power running, a DC current supplied from the battery B through the DC power line S is converted into currents of the U-, V-, W-phases, and these currents are fed to three-phase coils of the electric motors M, G through three-phase AC power lines A. At the time of generation or regeneration, further, the currents of the U-, V-, W-phases generated in the three-phase coils of the electric motors M, G are fed through the three-phase AC power lines A, are converted into DC currents, and are supplied to the battery B through the DC power line S.

In the circuit comprising the inverter, the smoothing circuit F connected to the DC power line S includes a smoothing capacitor C for removing low-frequency components, a parallel resistor R, as well as so-called Y-capacitors which constitute noise-removing means for removing high-frequency components (usually, several hundreds of kilohertz to several megahertz) leaking into the smoothing circuit F by grounding the middle point through a pair of Y-capacitors. Use of the Y-capacitors as a noise filter has been disclosed in JP-A-2000-315929.

SUMMARY OF THE INVENTION

As an example of an arrangement of the Y-capacitors on the DC bus line, there can be contrived the arrangements illustrated in FIGS. 6 and 7. The structure illustrated in FIG. 6 is an arrangement aimed chiefly at minimizing the impedance in the portion where the Y-capacitors are arranged. In this arrangement, connection portions S1$a$, S2$a$ are drawn toward one side of the line from the parallel bus bars S1, S2 constituting a DC bus line, the leads Ya on one end of the Y-capacitors are each connected to a respective connection portion S1$a$, S2$a$, and the leads Yb on the other end thereof are directly connected to a grounding terminal N. Further, the structure illustrated in FIG. 7 is an arrangement aimed chiefly at balancing the inductance components in the line from the source of noise to the Y-capacitors. In this arrangement, both leads of the capacitors Y are connected to the bus bars S1, S2 and to the grounding terminal N through electric wires La, Lb of an equal length.

The above arrangements are effective for fulfilling their respective objects. However, the function as a noise filter is not achieved to a sufficient degree if either the impedance of the filter portion is not minimized or the inductance components up to the filter portion are not balanced. Namely, in the arrangement illustrated in FIG. 6, it is presumed that the source of noise is on the left side in the drawing, the inductance component increases as viewed from the bus bar S1 on the side opposite to the grounded point, and the effect for removing noise is cancelled by the imbalance of inductance components. In the arrangement illustrated in FIG. 7, there exist electric wires La, Lb having an impedance larger than that of the bus bars S1, S2 or the lead wires of the capacitors, and the effect for removing noise is canceled by the large impedance.

The invention was created in view of the above circumstances. An object is to effectively use the effect of the Y-capacitors for removing noise. Another object of the invention is to minimize the space for arranging the Y-capacitors.

In order to achieve the above objects, there is provided a device for removing inverter noise in which a pair of bus bars extending in parallel are grounded via a pair of capacitors, respectively, wherein the capacitors are connected to the bus bars and to a grounding terminal at positions symmetrical to the pair of bus bars.

In such a structure, it is desired that the capacitors are arranged close to the bus bars with their lengthwise direction in parallel with the direction in which the bus bars extend. The bus bars are constituted by strap members with an insulating material sandwiched therebetween, and the capacitors are arranged on the outer sides of the two bus bars. Further, the capacitors are so arranged that the side surfaces thereof in the direction of thickness are parallel with the plate surfaces of the bus bars. Further, the capacitors have leads at both ends thereof in the lengthwise direction, and the bus bars are connected to the leads on one side of the capacitors at connection portions partly protruding from the bus bars at positions facing the ends of the capacitors in the lengthwise direction thereof. Further, the bus bars are drawn along the smoothing capacitors between the peripheral wall of an inverter casing and the smoothing capacitors placed over the switching element power modules contained in the inverter casing.

According to a structure of the invention, the inductance components are substantially balanced up to a point that is grounded by the Y-capacitors on the DC bus line connected to a converter circuit which is a source of noise. Further, the impedance becomes very small in the front and rear connection portions holding the capacitors therebetween. Therefore, this structure makes it possible to effectively remove high-frequency noise from the DC circuit of the inverter.

BRIEF DESCRIPTION OF THE DRAWINGS

The invention will be described with reference to the drawings, in which.

DETAILED DESCRIPTION OF PREFERRED EMBODIMENTS

Figure 1:
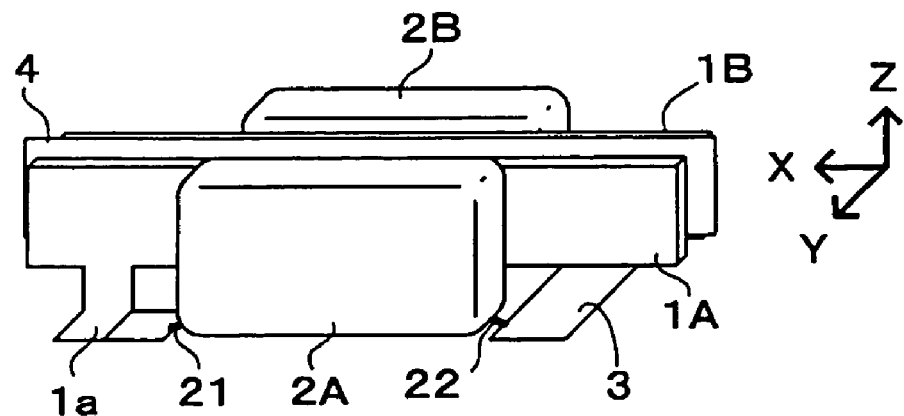
FIG. 1 is a perspective view schematically illustrating a device for removing inverter noise according to the invention.

An embodiment of the invention will now be described with reference to the drawings. FIG. 1 is a perspective view schematically illustrating a device for removing inverter noise. The device is structured so as to ground a pair of bus bars 1A, 1B extending in parallel between a pair of capacitors 2A, 2B. The capacitors 2A, 2B are connected to the bus bars and to a grounding terminal 3 at symmetrical positions holding the pair of bus bars 1A, 1B therebetween. Because of this arrangement, the inductance component is substantially balanced up to a point grounded by the Y-capacitors 2A, 2B on the DC bus line connected to a converter circuit which is a source of noise. Besides, the impedance becomes very small in the front and rear connection lines holding the capacitors 2A, 2B therebetween. Therefore, this structure makes it possible to effectively remove high-frequency noise from the DC circuit of the inverter.

Here, the bus bars 1A, 1B are strap members with an insulating member 4, such as an insulating paper, sandwiched therebetween. Therefore, the capacitors 2A, 2B are arranged adjacent to the bus bars with their lengthwise direction (X-axis direction in the drawing) in parallel with the direction in which the bus bars 1A, 1B extend, that is, the capacitors 2A, 2B are arranged on the outer sides of the two bus bars 1A, 1B. Further, the capacitors 2A, 2B are so arranged that the side surfaces thereof (surface direction, or plane, inclusive of X- and Z-axes in the drawing) are in parallel with the plate surfaces (similarly, the surface direction inclusive of X- and Z-axes in the drawing) of the bus bars 1A, 1B. The thickness of the capacitors 2A, 2B is defined by the distance (length in the Y-axis direction) between the X-Z planes, or side surfaces. The capacitors 2A, 2B are longer in the X-axis direction than their height in the Z-axis direction. This structure represents a minimum size of the capacitors 2A, 2B. Thus, because the two capacitors 2A, 2B are arranged along the bus bars 1A, 1B, that extend in a pair, the device for removing noise is arranged in a small space alongside the bus bars. Further, the device for removing noise is arranged on both sides of the pair of bus bars 1A, 1B, which are arranged close to each other, and along the outer sides of the bus bars 1A, 1B. In other words, the device for removing noise is arranged on both sides of the pair of bus bars arranged close to each other in a manner to lie along the bus bars on the outer sides thereof. Therefore, the device for removing noise inclusive of both bus bars occupies a small area. Namely, the capacitors 2A, 2B swell on each side of the bus bars 1A, 1B by a minimum thickness to occupy a minimum area. Thus, the device for removing noise swells on both sides of the bus bars by an amount equal to a minimum thickness of the capacitors, and occupies a minimum area.

Figure 2:
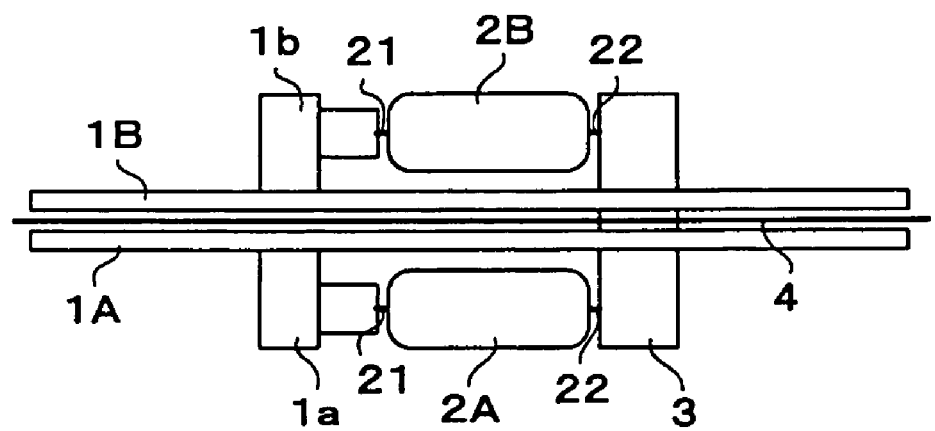
FIG. 2 is a plan view schematically illustrating the device for removing inverter noise according to the invention.

Referring to the arrangement in the plan view of FIG. 2, the capacitors 2A, 2B have leads 21, 22 at respective ends in the lengthwise direction thereof. Therefore, the bus bars 1A, 1B are connected to the leads 21 on one side of the capacitors 2A, 2B at connection portions 1a, 1b. The connection portions 1a, 1b partly protrude from the bus bars 1A, 1B toward positions facing the ends of the capacitors 2A, 2B in the lengthwise direction thereof. The capacitors 2A, 2B are grounded by directly connecting the leads 22 on the other end to the grounding terminal 3. Owing to this arrangement, the impedance components are minimized both on the side where the capacitors 2A, 2B are connected to the bus bars 1A, 1B and on the side where the capacitors 2A, 2B are grounded.

Figure 3:
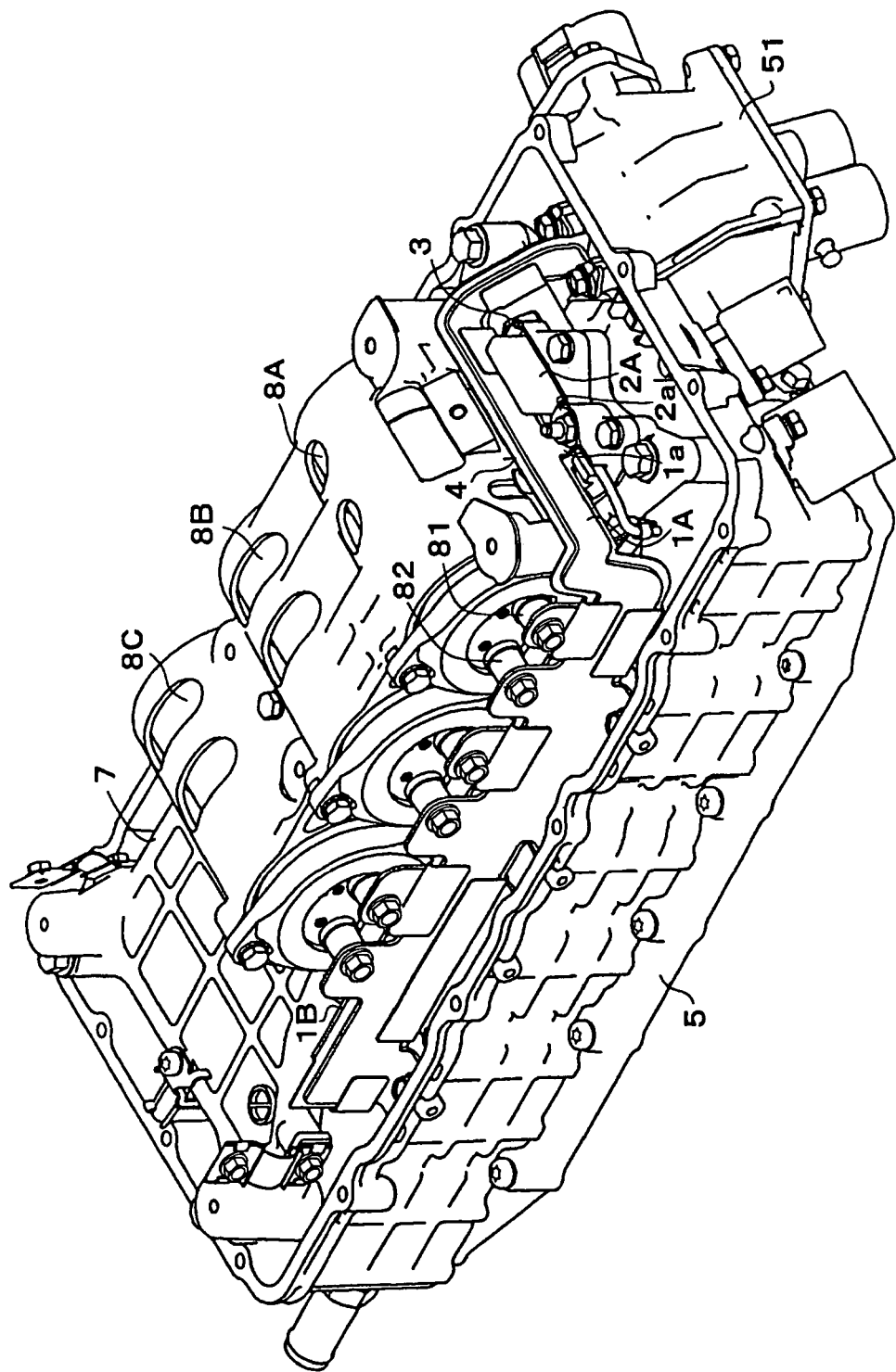
FIG. 3 is a perspective view of an inverter to which the invention is applied.
Figure 4:
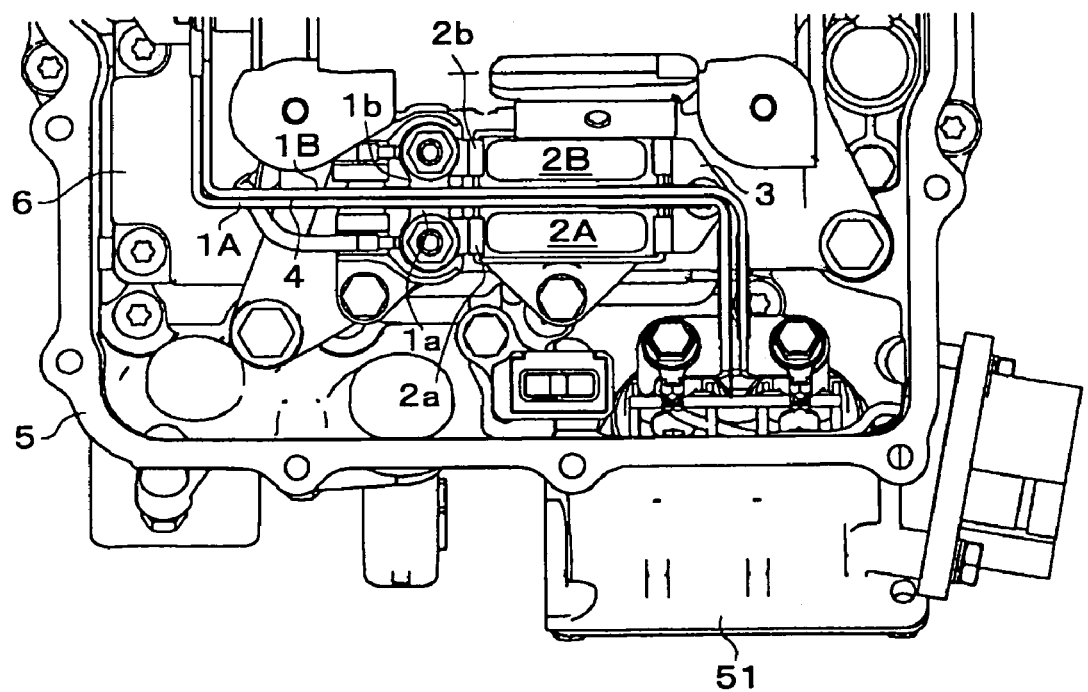
FIG. 4 is a partial plan view of the inverter according to the invention.
Figure 5:
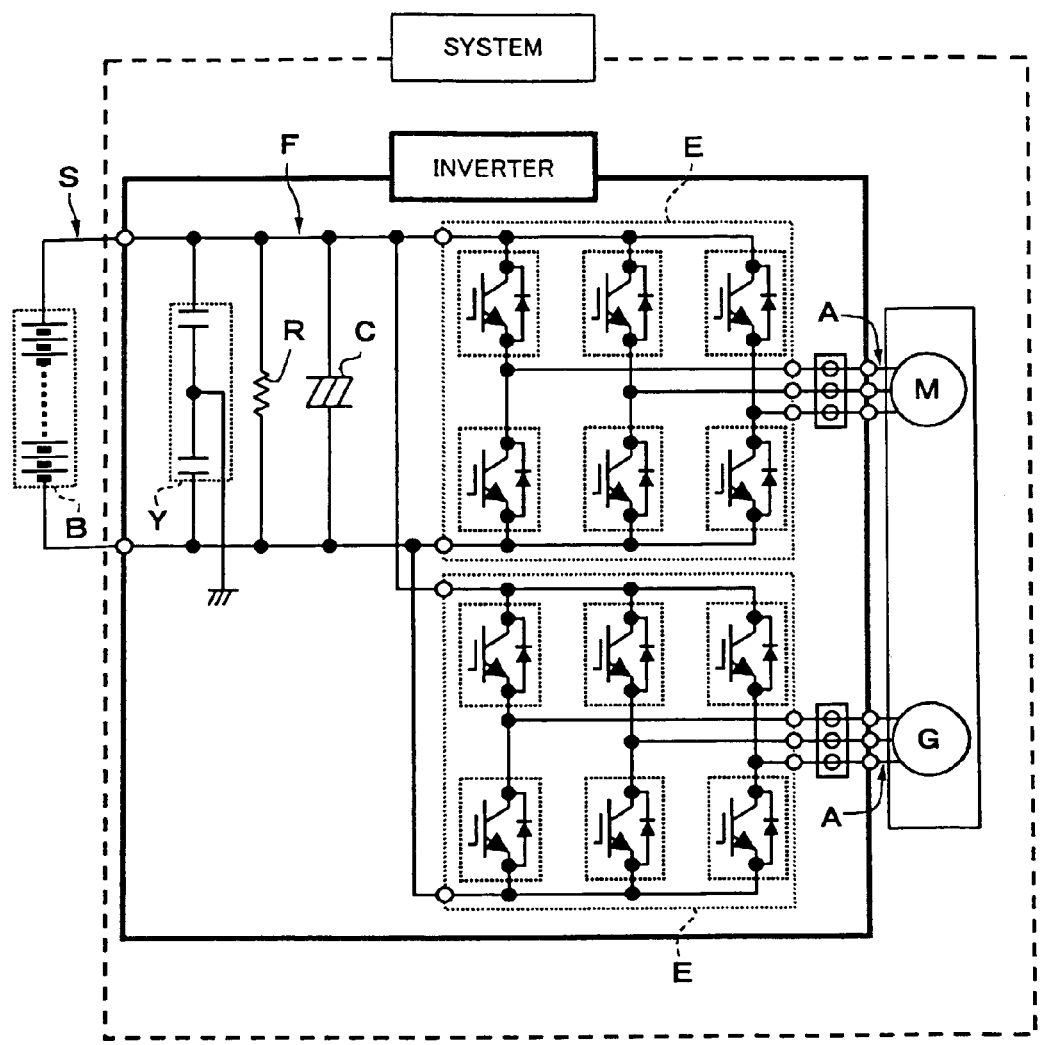
FIG. 5 is a diagram of an electric circuit illustrating a general circuit structure of an inverter for a drive unit.
Figure 6:
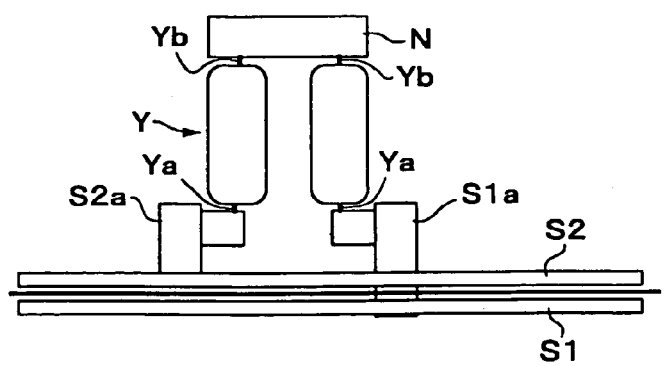
FIG. 6 is a general conceptual plan view schematically illustrating a device for removing inverter noise.
Figure 7:
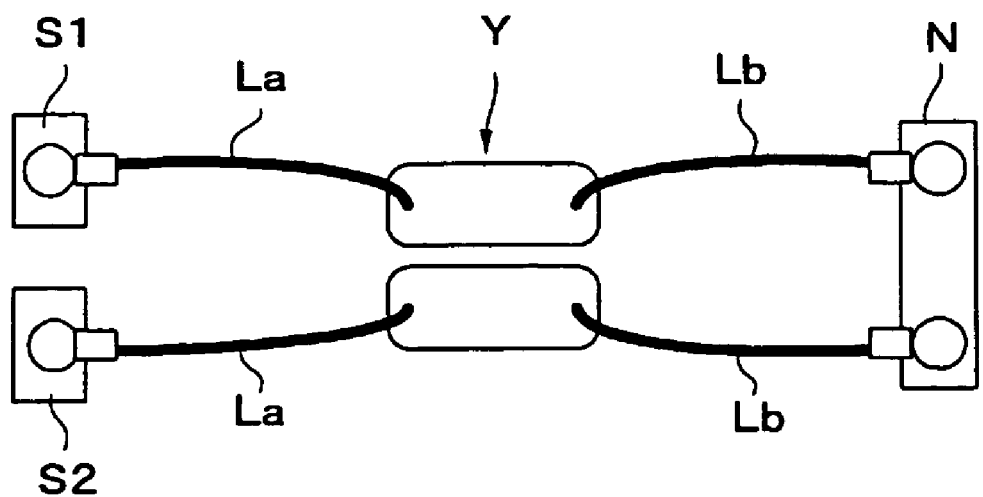
FIG. 7 is a plan view schematically illustrating another conceptual device for removing inverter noise.

FIG. 3 is a perspective view of the inverter and FIG. 4 is a plan view illustrating a portion of the inverter as applied to a drive unit for a hybrid car. The inverter is contained in an inverter casing 5 mounted on the upper part of the drive unit casing which contains the motor and the generator (not shown). Although not clearly illustrated in the drawing, the two switching element power modules 6 constituting the inverter have three-phase terminals directed to the back side, in FIG. 3 (away from viewer), and have DC terminals that are directed toward this side (long side toward viewer), being placed and secured on the side and bottom walls of the inverter casing 5. Three electrolytic capacitors 8A, 8B, 8C constituting the smoothing capacitors are arranged at the upper portion thereof and supported by a bracket 7. The electrolytic capacitors 8A, 8B, 8C have their terminals 81, 82 transversely arranged being directed toward the long side toward the viewer (FIG. 3) so as to be located close to the DC terminals of the switching element power modules 6.

While the switching element power modules 6 and the smoothing capacitors 8A, 8B, 8C are arranged to maintain the described relationship, the bus bars 1A, 1B constituting the DC bus line are drawn along the smoothing capacitors 8A, 8B, 8C between the peripheral wall of the inverter casing 5 and the smoothing capacitors 8A, 8B, 8C placed over the switching element power modules 6 contained in the inverter casing 5.

Described in further detail, the bus bars 1A, 1B are connected by bolts to two pairs of DC terminals of the switching element power modules 6 and to three pairs of terminals 81, 82 of the smoothing capacitors 8A, 8B, 8C at positions in the up-and-down direction (as viewed in FIG. 3) in the inverter casing 5. Starting from these portions, the bus bars 1A, 1B extend horizontally among the terminals with their plate surfaces being vertically oriented. The bus bars 1A, 1B extend in the direction in which the terminals are arranged, folded upward in front of the corner (left, front corner of FIG. 3) of the bracket 7, supporting the smoothing capacitors, to vertical maintaining the plate surfaces, after extending past the ends of the electrolytic capacitors 8C, 8B, 8A, the bus bars 1A, 1B are folded at right angles at the corner of electrolytic capacitor 8A to extend along the side surface of the smoothing capacitor 8A. The bus bars 1A, 1B are, then again, folded at a right angle to extend again in parallel with the initial direction but also extend downwardly. The bus bars 1A, 1B are finally folded in directions in which the ends are separated away from each other, and terminate so as to be secured by bolts to the conductors in the connector 51 provided on the inverter casing 5.

In this exemplary embodiment, the device for removing noise provided by the Y-capacitors is arranged at the portions of the bus bars extending along the side surface of the smoothing capacitor 8A. The connection portions 1a, 1b of the bus bars 1A, 1B described in the above embodiment are provided by strap members that extend downward from the lower sides of the strap-like bus bars 1A, 1B and are folded in a horizontal direction. In this embodiment, there are overlapped, on these portions, fastening metal fittings 2a, 2b connected to the leads on one side of the capacitors 2A, 2B that are fastened, by nuts, to the bolts extending from the plate on which the capacitors 2A, 2B are placed so as to be connected together. The leads on the other side of the capacitors 2A, 2B are grounded by being secured to the bracket 7, for the smoothing capacitors 8A–8C, by using screws and a fastening metal fitting 3 commonly connected to the leads on the other side thereof as a grounding terminal 3 that traverses the bus bars 1A, 1B on the lower side thereof.

In this embodiment, too, the capacitors 2A, 2B are arranged on the outer sides of the bus bars with their lengthwise direction in parallel with a direction in which the bus bars 1A, 1B extend. Further, the capacitors 2A, 2B are arranged with their side surfaces in parallel with the plate surfaces of the bus bars 1A, 1B.

According to the exemplary embodiment as described above, all goals are realized, and the effects obtained by the embodiment are realized in the inverter in the drive unit for hybrid cars. In particular, the embodiment offers a great advantage in limiting the space necessary for the device for removing noise in the inverter casing as the device for removing noise is arranged in a narrow space by using space surrounding the smoothing capacitors of the inverter contained in the inverter casing.

Though the exemplary embodiment has dealt with a drive unit for hybrid cars, it should be noted that the invention is in no way limited to this embodiment only but can also be widely applied to any apparatus for controlling the drive by an inverter, such as a drive unit for electric cars using, at least, electric motors. Namely, the invention can be put into practice by modifying the described structure without departing from the scope of claims of the invention.

What is claimed is:

1. A device for removing inverter noise in which a pair of bus bars extending in parallel are grounded via a pair of capacitors, respectively, wherein the pair of capacitors are arranged at positions symmetrically on opposite sides of the pair of bus bars, and each capacitor is connected to the adjacent bus bar at one side and a grounding terminal at the other side.

2. The device for removing inverter noise according to claim 1, wherein the capacitors are arranged close to the bus bars with their lengthwise direction in parallel with the direction in which the bus bars extend.

3. The device for removing inverter noise according to claim 2, wherein the bus bars comprise strap members with an insulating material sandwiched therebetween.

4. The device for removing inverter noise according to claim 3, wherein the capacitors are so arranged that side surfaces thereof in the direction of thickness, are in parallel with plate surfaces of the bus bars.

5. The device for removing inverter noise according to claim 4, wherein the capacitors have leads at each end in a lengthwise direction, and each bus bar is connected to the lead on one end of a paired capacitor at a connection portion partly protruding from the bus bar at a position facing the end of the paired capacitor in the lengthwise direction thereof.

6. The device for removing inverter noise according to claim 4, wherein the bus bars extend along ends of smoothing capacitors, between a peripheral wall of an inverter casing and the smoothing capacitors, and are placed over switching element power modules contained in an inverter casing.

7. The device for removing inverter noise according to claim 3, wherein the capacitors have leads at each end thereof in a lengthwise direction, and each bus bar is connected to the lead on one end of a paired capacitor at a connection portion partly protruding from the bus bar at a position facing the end of the paired capacitor in the lengthwise direction thereof.

8. The device for removing inverter noise according to claim 3, wherein the bus bars extend along ends of smoothing capacitors, between a peripheral wall of an inverter casing and the smoothing capacitors, and are placed over switching element power modules contained in an inverter casing.

9. The device for removing inverter noise according to claim 2, wherein the capacitors have leads at each end thereof in a lengthwise direction, and each bus bar is connected to the lead on one end of a paired capacitor at a connection portion partly protruding from the bus bar at a position facing the end of the paired capacitor in the lengthwise direction thereof.

10. The device for removing inverter noise according to claim 2, wherein the bus bars extend along ends of smoothing capacitors, between a peripheral wall of an inverter casing and the smoothing capacitors, and are placed over switching element power modules contained in the inverter casing.

11. The device for removing inverter noise according to claim 1, wherein the bus bars are constituted by strap members with an insulating material sandwiched therebetween.

12. The device for removing inverter noise according to claim 11, wherein the capacitors are so arranged that side surfaces thereof, in the direction of thickness, are in parallel with plate surfaces of the bus bars.

13. The device for removing inverter noise according to claim 12, wherein the capacitors have leads at each end thereof in a lengthwise direction, and each bus bar is connected to the lead on one end of a paired capacitor at a connection portion partly protruding from the bus bar at a position facing the end of the paired capacitor in the lengthwise direction thereof.

14. The device for removing inverter noise according to claim 12, wherein the bus bars extend along ends of smoothing capacitors, between a peripheral wall of an inverter casing and the smoothing capacitors, and are placed over switching element power modules contained in the inverter casing.

15. The device for removing inverter noise according to claim 11, wherein the capacitors have leads at each end thereof in a lengthwise direction, and each bus bar is connected to the lead on one end of a paired capacitor at a connection portion partly protruding from the bus bar at a position facing the end of the paired capacitor in the lengthwise direction thereof.

16. The device for removing inverter noise according to claim 11, wherein the bus bars extend along ends of smoothing capacitors, between a peripheral wall of an inverter casing and the smoothing capacitors, and are placed over switching element power modules contained in the inverter casing.

17. The device for removing inverter noise according to claim 1, wherein the capacitors have leads at each end thereof in a lengthwise direction, and each bus bar is connected to the lead on one end of a paired capacitor at a connection portion partly protruding from the bus bar at a position facing the end of the paired capacitor in the lengthwise direction thereof.

18. The device for removing inverter noise according to claim 1, wherein the bus bars extend along ends of smoothing capacitors, between a peripheral wall of an inverter casing and the smoothing capacitors, and are placed over switching element power modules contained in the inverter casing.

19. The device for removing inverter noise according to claim 1, wherein the pair of capacitors are connected to the pair of bus bars and a common grounding terminal that is arranged in the transverse direction to the bus bars.

20. The device for removing inverter noise according to claim 2, wherein the pair of capacitors are connected to the pair of bus bars and a common grounding terminal that is arranged in the transverse direction to the bus bars.

21. The device for removing inverter noise according to claim 3, wherein the pair of capacitors are connected to the pair of bus bars and a common grounding terminal that is arranged in the transverse direction to the bus bars.

22. The device for removing inverter noise according to claim 4, wherein the pair of capacitors are connected to the pair of bus bars and a common grounding terminal that is arranged in the transverse direction to the bus bars.

23. The device for removing inverter noise according to claim 11, wherein the pair of capacitors are connected to the pair of bus bars and a common grounding terminal that is arranged in the transverse direction to the bus bars.

24. The device for removing inverter noise according to claim 12, wherein the pair of capacitors are connected to the pair of bus bars and a common grounding terminal that is arranged in the transverse direction to the bus bars.

* * * * *